Patented Nov. 15, 1938

2,136,377

UNITED STATES PATENT OFFICE 2,136,377

COLORED CELLULOSE AZO COMPOUNDS AND THEIR METHOD OF PRODUCTION

Ralph Dinklage, New York, N. Y.

No Drawing. Application December 16, 1935, Serial No. 54,725

16 Claims. (Cl. 260—144)

This application is a continuation in part of my prior application, Serial Number 531,264, filed April 18, 1931.

The invention relates to new dyestuffs containing a cellulose molecule in ether or ester combination with a dyestuff molecule, and to the method of producing such dyestuffs.

A considerable number of dyestuffs, though producing fine and highly desirable shades, possess the disadvantage of not being fast to light. I have discovered that the fastness to light of dyestuffs may be greatly increased by combining a cellulose molecule with a dyestuff molecule in such manner that at least one of the reactive OH groups per glucose residue of the cellulose molecule is esterified or etherified with an aromatic carbocyclic compound, the latter being a constituent part of the molecule structure of the dyestuff.

The products obtained in accordance with the invention are of greater stability, and possess a higher fastness to light than the corresponding dyestuff not coupled to a cellulose molecule, and due to the water insolubility of the cellulose esters or ethers of this type, a considerable improvement in fastness to washing is obtained. The new dyestuffs may be used very advantageously for dyeing and printing textile fibres or fabrics, whereby the dye bath or the printing paste, as the case may be, may comprise either a solution or a suspension of the cellulose dyestuff. These dyestuffs may be used on animal as well as on vegetable fibres. In the case of artificial fibres produced by regenerating cellulose or cellulose derivatives from their solutions in a so-termed spinning process, it is sometimes of advantage to add a coloring material to the spinning solution, and for this purpose my cellulose dyestuffs are well suited. The new products may be also used successfully as coloring materials for varnishes, lacquers, and the like, either dissolved in the varnish or lacquer, or incorporated in the form of a pigment.

In accordance with the invention a cellulose or cellulose derivative esterified or etherified with an aromatic nitro-carbocyclic compound or derivative, is converted into the amino compound, which is thereafter diazotized and subsequently coupled with a suitable coupling agent. Such cellulose nitro-esters or ethers that may be used for the production of the novel dyestuffs, and possessing the afore-mentioned desirable characteristics, are represented by the following general formulae:

$$Z-\left[O-R-R^2-(NO_2)_m \atop \| \atop O\right]_x \quad \text{or} \quad Z-[O-R-R^2-(NO_2)_m]_x$$

in which Z represents a glucose residue of a cellulose molecule, R, an alkyl residue, in the case of higher alkyl homologues, they may be either of straight or branched chain configuration, $R^2$, a carbocyclic structure, $m$, the number of nitro groups carried by the carbocyclic structure, while $x$ designates the number of OH groups so esterified or etherified per glucose residue of the cellulose molecule. It is understood that also mixed esters or ethers may be used, such as cellulose acetate-benzoate, nitro-benzoate, acetate-benzyl ether, ethyl ether-benzoate, etc., which are characterized by the general formulae:

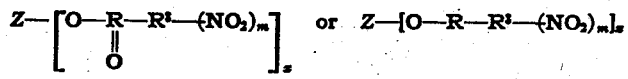

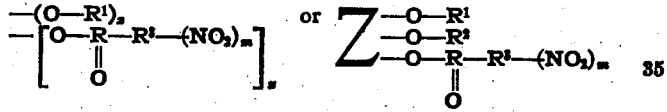

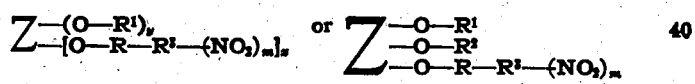

in which $R^1$ and $R^2$ represent either an aliphatic or an aromatic acid radical or an alkyl or aralkyl, while $y$ is the number of OH groups per glucose residue of the cellulose molecule so esterified and/or etherified. It is always essential, however, that at least one of the three reactive OH groups per glucose residue of the cellulose molecule is esterified or etherified with an aromatic nitro-carbocyclic compound or derivative.

It is generally assumed that the instability of certain dyestuffs is primarily due to their decomposition resulting from the action of ultra-violet rays, and it is my belief that the increased fastness to light and the enhanced stability of the dyestuffs, made in accordance with my invention, is substantially due to the enlargement of the dyestuff molecule obtained by its combination with a cellulose molecule in the above-described manner, whereby the new dyestuff becomes less sensitive to the action of ultra-violet rays.

The following examples illustrate the method of carrying out my invention without, however, limiting the same to the illustrated embodiments.

Example 1.—10 parts by weight of finely cut cellulose p-nitro benzoic acid ester are mixed with 80 parts by volume of a normal NaHS solution, whereupon the mixture is heated on a water bath of a temperature of 60 to 70° C. for one hour with rigorous stirring. After filtering and thorough washing, the amino product possessing a yellowish appearance, is mixed with 50 parts by volume of a diluted sulphuric acid (10 parts by volume concentrated $H_2SO_4$+50 parts by volume $H_2O$), whereupon the mixture is heated on the water bath at a bath temperature of 70° C. for a period of from 15 to 30 minutes, preferably with stirring. After cooling, some ice is added, and the receptacle is also outwardly cooled with ice. After the mixture is well cooled, a solution of 4 parts by weight of sodium nitrite in 16 parts by volume of water, is slowly added with rigorous stirring. The temperature should be maintained at approximately 4° C. and it is advisable to add from time to time some ice to the mix. The stirring is continued, maintaining the temperature below 4° C. for at least 15 minutes, whereupon this diazo suspension, being constantly kept cool, is gradually added with rigorous stirring to a solution of 9.2 parts by weight of $\beta$ naphtol dissolved in 165 parts by volume of a 2n. NaOH solution. After the last portion of the azo suspension has been added, the stirring of the now brown-red coupling solution is continued for a period of from ½ to 1 hour. After filtration and thorough washing, the resulting product is of a fine orange shade, and of fibrous texture.

Instead of the cellulose p-nitro-benzoic acid ester, I may use the cellulose p-nitro benzyl ether, and convert the same into the azo dyestuff in substantially the same manner as described in the foregoing example. In most cases the stability of the ether compounds is even greater than that of the ester dyestuffs. The reaction, furthermore, is not limited to p-nitro compounds, but also ortho and meta nitro substances may be used. The same result is obtained by substituting the ester or ether used in the above example by a mixed ester or ether, such as cellulose acetate-nitro benzoate, cellulose nitrate-nitro benzoate, cellulose ethyl ether-nitro benzoate, cellulose acetate-nitro benzyl ether, cellulose nitrate-nitro benzyl ether, cellulose ethyl ether-nitro benzyl ether, and the homologues of such and similar substances, substantially as represented by and expressed in the above-recited generic formulae. The color produced by all these is usually substantially the same as that of the straight esters or ethers, though in some instances a bathochrome or hypsochrome effect is obtained, due to the presence of groups characteristic for producing such effects. As a general rule, however, this bathochrome or hypsochrome effect is not very pronounced, due to the fact that these groups are not in direct combination with the carrier molecule of the chromophore group or groups, but are esterified or etherified with the cellulose, and can, therefore, exercise their influence only indirectly. Naturally, the introduction of bathochrome or chromophore groups directly into the carrier molecule of the chromophore group or groups, will effect a change or modification of the color. The introduction of, for instance, a second azo group, as illustrated in Example 5, is representative of such a procedure and is within the purview of my invention.

The nitro esters or ethers that may be used in accordance with the invention are easily obtained by the commonly used methods for esterifying or etherifying cellulose or cellulose derivatives, for example, by treating alkali cellulose or partly esterified or etherified alkali cellulose with a nitro aromatic acid chloride or a nitro aralkyl chloride or with an aromatic acid chloride, or an aralkyl chloride, and subsequently nitrating the ester or ether obtained. The nitration in the latter instance may be effected either in a solution of the ester or ether in an organic solvent inert to aromatic nitration, or in a suspension of the ester or ether. Where a suspension of the ester or ether is nitrated, which is necessary if the ester or ether is but difficultly soluble in the usual commercial solvents, care must be taken that the suspension is as fine as possible. I have found it of advantage to proceed in the following manner: 22 parts by weight of the cellulose ester or ether are treated on a water bath of 70° C. for 7 hours with rigorous stirring, with 500 parts by volume of a nitrating solution (346 parts by volume concentrated $H_2SO_4$+305 parts by volume concentrated $HNO_3$). After the mixture has cooled down, it is added to a large amount of water, whereupon the product is permitted to settle; after decantation and washing, the nitro product is separated by filtration and thoroughly washed. In every case of esterification or etherification it is of advantage to add as a catalyst a slight amount of the metal halide to be separated during the esterification or etherification process.

Sometimes when the H of the OH group of the glucose residue of the cellulose molecule to be esterified is activated by the presence of certain activating groups such as the nitro, acetyl and similar groups, it is not necessary to use a cellulose metal compound. In the case, for instance, of cellulose dinitrate or diacetate, the esterification will smoothly proceed with the acid chloride in the presence of a suitable catalyst, such as $PCl_5$ and like substances, with evolution of HCl. If, in addition, the Cl of the acid chloride is activated by the presence of activating groups, such as COOH, $NO_2$, etc., the reaction will even proceed without such catalyst, as illustrated by Example 6. Sometimes it is advisable to use the aralkyl bromide or the aromatic acid bromide for the etherification or esterification.

Example 2.—2 parts by weight of the cellulose amino ester produced as described in Example 1, is treated with 10 parts by volume of a diluted sulphuric acid (of the same strength as used in Example 1) and heated on a water bath of a bath temperature of 70° C. from 15 to 30 minutes. After cooling and adding ice to the mix, as well as outwardly cooling the receptacle, a solution of 2 parts by weight of sodium nitrite in 8 parts by volume of water is slowly added with rigorous stirring to the mix, maintaining the temperature at 4° C. The stirring is continued, maintaining the temperature below 4° C. for at least another ½ hour after the last portion of the nitrite has been added. The diazo suspension, being constantly kept cool, is then gradually ded to a rigorously stirred solution of 4.1 parts by weight of "H" acid (the term commonly used for 4-amino-5-hydroxy-2, 7-naphthalene disulphonic acid) in 57 parts by volume of a 2n. NaOH. After all of the diazo suspension has been added, the stirring is continued for at least one hour, whereby the color of the solution turns gradually a dark purple. The resulting product, after filtration and thorough washing, is of a lilac color and possesses a fibrous texture.

Example 3.—2 parts by weight of the amino ester or ether obtained as outlined in Example 1, is heated with sulphuric acid, thereafter cooled and diazotized in the manner specified in Example 1. The diazo suspension is gradually added to a rigorously stirred solution of 2.7 parts by weight of salycilic acid in 9.5 parts by weight of soda dissolved in 40 parts by volume of water. The stirring is continued for at least one hour, the solution turning gradually dark yellow. After filtering and washing, the resulting product is a fine yellow color and of fibrous texture.

Example 4.—2 parts by weight of the amino ester or ether diazotized as recited in Example 1, is gradually added while constantly kept cool, to a vigorously stirred solution of 5.6 parts by weight of "R" salt in a solution of 7 parts by weight of soda ($Na_2CO_3+1H_2O$) in 82 parts by volume of water. The stirring is continued for at least one hour. The resulting product, after filtration and thorough washing, is of a fine red shade and possesses a fibrous texture.

Example 5.—4.1 parts by weight of "H" acid are dissolved in a solution of 3 parts by weight of soda ($Na_2CO_3+1H_2O$) in 35 parts by volume of water (add more soda if necessary until reaction is alkali). The solution is admixed with ice and a diluted HCl solution is added until a slightly acid reaction (Congo paper) is obtained. A diazo solution of 2.1 parts by weight of p-nitranilin is prepared by dissolving the same in 5.5 parts by volume of a diluted HCl (15 parts by volume of concentrated HCl+20 parts by volume of water) and adding the same rapidly to a mixture comprising 45 parts by weight of ice, 30 parts by volume of water, 1.5 parts by volume of concentrated HCl and 7.6 parts by volume of a sodium nitrite solution (1.4 parts by weight sodium nitrite in 10 parts by volume of water). The diazotized nitranilin solution is then gradually added to the rigorously stirred solution of "H" acid. Stirring is continued for one hour and during this period, preferably after ½ hour, a diluted acetate solution is carefully added to buffer the prevailing acidity. After the reaction is completed, the solution having acquired a dark red color, so much soda is added that a slightly alkaline reaction is obtained. An additional 7 parts by weight of soda are then added to the mix to insure alkalinity during the subsequent coupling. A diazo suspension produced from 2 parts by weight of the amino ester or ether, prepared as described in Example 1, is then gradually added to the rigorously stirred coupling solution. The stirring is continued for a period of from 1½ to 2½ hours. The resulting product, after filtration and thorough washing, is of a dark blue color and possesses a fibrous texture.

Example 6.—12.6 parts by weight of a cellulose dinitrate (approximately 11% N) in a solution of 130 parts by weight of amyl acetate are admixed with 8 parts by weight of p-nitro-benzoic acid dissolved hot in 150 parts by volume of ethyl acetate. The mixture is well stirred until substantially all of the acid is dissolved. 12.5 parts by weight of thionyl chloride are then gradually added with continuous stirring. Sufficient $PCl_5$ to assist the liberation of HCl is added as a catalyst. After the last portion of the thionyl chloride has been added, the stirring is continued on a water bath for a period of from 2½ to 3½ hours. Care should be taken that no moisture enters the receptacle during the reaction. It is of advantage to provide the reflux condenser with a drying tube filled with fused calcium chloride. For the same purpose it is advisable to use a seal for the stirrer. After the reaction is completed, the mix is added in a fine stream to a large amount of vigorously stirred cooled water. After filtering and thorough washing, the product is dried, and extracted with alcohol in order to remove unesterified nitrobenzoic acid. The cellulose nitrate-nitro-benzoate is insoluble in alcohol. The nitro ester is then reduced, treated with acid to form the amino salt, and diazotized as described in Example 1. The diazo product may then be coupled with any one of the coupling agents mentioned in Examples 1 to 5, or with any other suitable coupling agent.

The derivatives of the partly nitrated and/or acetylated celluloses have the advantage that they are more easily soluble in many of the commonly used organic solvents than other cellulose derivatives, such as, for instances, the straight benzoates, and particularly the dibenzoates.

In the foregoing example, instead of the p-nitro-benzoic acid, the p-nitro benzoic acid anhydride may be used, in which case the presence of the catalyst ($PCl_5$) may be dispensed with. The reaction proceeds even more smoothly with p-nitro-phthalic acid anhydride or a mono ester of p-nitro-phthalic acid, such as, for instance, the p-nitro-phthalic acid monobutyl ester. Here again the nitro products may be also obtained by nitration, subsequent to the esterification with the plain anhydrides or acids or acid esters.

Instead of diazotizing the cellulose amino derivative and coupling the same with a suitable coupling agent, it is possible and may be sometimes of advantage to follow a different procedure. The cellulose molecule in such cases may be esterified or etherified with an aromatic system that is ordinarily a coupling medium for diazotized substances. The cellulose, for instance, may be esterified with salycilic acid, and may then be treated with a diazo solution of, for instance, P-nitranilin. In a like manner it is possible to connect the cellulose in ether or ester combination with an α and β naphthyl carboxylic acid and similar substances.

In all the examples care should be taken that the salt formation of the amino ester or ether prior to the diazotation is as complete as possible. The finer the individual particles of the amino compound are, the better will the salt formation proceed. Dependent on the fineness of the particles, it may be necessary to heat the amino compound together with the acid on a water bath of a bath temperature of 70° C. for at least 15 minutes. In many instances, however, longer periods up to one hour and more are required until the salt formation is completed. As a rule, the formation of the sulphate proceeds more rapidly than the salt formation with other acids. Particularly the formation of the chloride is at times difficult to obtain, and in many cases, despite higher concentrations and prolonged heating, the chloride formation is incomplete and unsatisfactory. It is preferred, therefore, to use sulphuric acid for the salt formation of the amino compound.

It should be observed that in each case the time within which the diazotation is completed is primarily dependent upon the particle fineness of the amino salt. It is sometimes necessary to continue the stirring, maintaining the temperature below 4° C., after the addition of the nitrite solution, for an additional 5 to 30 minutes and more if necessary, to insure proper and complete diazotation.

The same considerations are true for the coupling reaction. In this instance, however, the time within which the coupling is completed is not only dependent upon the particle fineness of the diazo suspension, but also to a considerable extent upon the nature of the coupling agent. Some media will couple better than others, and it is generally necessary to continue the stirring of the coupling mixture for at least 15 minutes after all of the diazo suspension has been added. In many instances the stirring must be continued for a period of 2 hours or even more, until the coupling reaction is completed.

In all cases where, for effective coupling, an alkaline condition is requisite, it is necessary to add sufficient alkali, either in the form of alkali hydroxide, or alkali carbonate to the coupling solution, to take care of the acid added with the diazotate and to maintain at all times an alkaline reaction. Naturally, where it is essential that the coupling be effected under acid conditions, care should be taken that the coupling solution is slightly acid or at least neutral. In such cases it is of advantage to add a slight amount of an acetate solution to buffer the acid introduced with the diazo solution, for, if the acidity is too high, the coupling will proceed, but unsatisfactorily.

It is understood that where the intermediary products with which the various reactions are carried out are soluble in a particular solvent, it is possible and frequently of advantage, to carry out the various reactions in solution.

It is within the scope of my invention to substitute polynitro compounds for the mononitro compounds hereinabove referred to, and particularized in the examples, and to obtain thereby cellulose polyazo dyestuffs.

Inasmuch as the presence of an auxochrome group is an essential pre-requisite in conjunction with a chromophore group for any dyestuff, it is understood that such auxochrome groups are present in the products obtained in accordance with the invention. They may be either already present in the aromatic carbocyclic acid radical, or the carbocyclic aralkyl with which the cellulose molecule is esterified or etherified, or they may be introduced as a constituent part of the coupling agent, or else may be introduced by a subsequent treatment (i. e., sulphonation). It will be noted that the dyestuffs obtained by the afore-mentioned examples possess such auxochrome groups as, for instance, OH, SO₃H. Where, however, the colored products are merely used as pigments, and where their fixation upon a fiber or fibrous material is not contemplated, as, for instance, in their application as pigments for varnishes, lacquers and the like, such auxochrome groups need not be present.

Wherever the term "cellulose molecule" appears in the specification and claims, it is used in its broadest sense, and includes the cellulose molecule as such, as well as the residue of a cellulose molecule, a molecule of a cellulose derivative, such as esters, ethers, mixed esters, mixed ethers, ester ethers, and the residue of such cellulose derivative molecules.

I claim:—

1. A new dyestuff consisting substantially essentially of a colored cellulosic material of the general formula

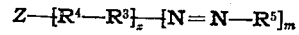

in which Z represents a radical of a member of the cellulose group consisting of cellulose, cellulose esters, cellulose ethers, cellulose mixed esters, cellulose mixed ethers and cellulose esters ethers, $R^3$ at least one radical of an aromatic compound, $R^4$ a radical of a member of the group consisting of aliphatic alcohols and aliphatic acids, $R^5$ any aromatic system, $m$ the number of azo groups carried by $R^3$, $x$ the number of linkages of $R^4$ to Z, $m$ and $x$ being at least one in number for every glucose radical of Z, and at least one member of the group consisting of $R^3$, $R^4$ and $R^5$ carrying at least one auxochrome group.

2. A new dyestuff in accordance with claim 1 in which $R^4$ is a radical of an aliphatic alcohol in ether combination with at least one of the OH groups of Z per glucose radical and in which said auxochrome group is carried by at least one member of the group consisting of $R^3$ and $R^5$.

3. A new dyestuff in accordance with claim 1 in which $R^4$ is a radical of an aliphatic acid in ester combination with at least one of the OH groups of Z per glucose radical and in which said auxochrome group is carried by at least one member of the group consisting of $R^3$ and $R^5$.

4. A new dyestuff consisting substantially essentially of a colored cellulosic material of the general formula

in which Z represents a radical of a member of the cellulose group consisting of cellulose, cellulose esters, cellulose ethers, cellulose mixed esters, cellulose mixed ethers and cellulose esters ethers,—$R^4$—$R^3$—a radical of an aromatic acid in ester combination with at least one of the OH groups of Z per glucose radical, $R^5$ any aromatic system, $m$ the number of azo groups carried by said aromatic acid, $x$ the number of ester linkages of—$R^4$—$R^3$—to Z, $m$ and $x$ being at least one in number for every glucose radical of Z, and at least one member of the group consisting of—$R^4$—$R^3$—and $R^5$ carrying at least one auxochrome group.

5. A new dyestuff in accordance with claim 4 in which said auxochrome group is carried by—$R^4$—$R^3$—.

6. A new dyestuff in accordance with claim 4 in which said auxochrome group is carried by $R^5$.

7. A new dyestuff consisting substantially essentially of a colored cellulosic material of the general formula

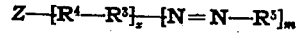

in which Z represents a radical of a member of the cellulose group consisting of cellulose, cellulose esters, cellulose ethers, cellulose mixed esters, cellulose mixed ethers and cellulose esters ethers,—$R^4$—$R^3$—a radical of an aromatic alcohol in ether combination with at least one of the OH groups of Z per glucose radical, $R^5$ any aromatic system, $m$ the number of azo groups carried by said aromatic alcohol, $x$ the number of ether linkages of—$R^4$—$R^3$—to Z, $m$ and $x$ being at least one in number for every glucose radical of Z, and at least one member of the group consisting of—$R^4$—$R^3$—and $R^5$ carrying at least one auxochrome group.

8. A new dyestuff in accordance with claim 7 in which said auxochrome group is carried by—$R^4$—$R^3$.

9. A new dyestuff in accordance with claim 7 in which said auxochrome group is carried by $R^5$.

10. A process for the manufacture of new dyestuffs which comprises reducing a cellulosic material consisting substantially essentially of a cellulose derivative of the general formula $$Z-[R^4-R^3]_x-[NO_2]_m$$

in which Z represents a radical of a member of the cellulose group consisting of cellulose, cellulose esters, cellulose ethers, cellulose mixed esters, cellulose mixed ethers and cellulose esters ethers, $R^3$ at least one radical of an aromatic compound, $R^4$ a radical of a member of the group consisting of aliphatic alcohols and aliphatic acids, $m$ the number of nitro groups carried by $R^3$ and $x$ the number of linkages of $R^4$ to Z, $m$ and $x$ being at least one in number for every glusoce radical of Z, then treating with acid to form an amino salt, thereafter diazotizing said salt and coupling the diazotate with a suitable coupling agent, said coupling agent and said cellulose derivative being so selected that at least one of them carries at least one auxochrome group.

11. Process in accordance with claim 10 in which a suspension of said salt is diazotized and coupled.

12. A process for the manufacture of new dyestuffs which comprises nitrating a suspension of a cellulosic material consisting substantially essentially of a cellulose derivative of the general formula $$Z-[R^4-R^3]_x$$

in which Z represents a radical of a member of the cellulose group consisting of cellulose, cellulose esters, cellulose ethers, cellulose mixed esters, cellulose mixed ethers and cellulose esters ethers, $R^3$ at least one radical of an aromatic compound, $R^4$ a radical of a member of the group consisting of aliphatic alcohols and aliphatic acids and $x$ the number of linkages of $R^4$ to Z, $x$ being at least one in number for every glucose radical of Z, reducing the nitro product obtained, then treating with an acid to form an amino salt, thereafter diazotizing said salt and coupling the diazotate with a suitable coupling agent, said coupling agent and said cellulose derivative being so selected that at least one of them carries at least one auxochrome group.

13. A process for the manufacture of new dyestuffs which comprises esterifying a cellulose material with a sufficient amount of an aromatic acid of the general formula $R^4$—$R^3$ in which $R^3$ is a radical of an aromatic compound capable of coupling with a diazotate and $R^4$ a radical of an aliphatic acid, to thereby form a product consisting substantially essentially of a cellulose ester containing at least one aromatic acid radical for every glucose radical present and coupling said ester with a diazotate, said aromatic acid and said diazotate being so selected that at least one of them carries at least one auxochrome group.

14. A process for the manufacture of new dyestuffs which comprises etherifying a cellulose material with a sufficient amount of an aralkyl alcohol of the general formula $R^4$—$R^3$ in which $R^3$ is a radical of an aromatic compound capable of coupling with a diazotate and $R^4$ a radical of an alkyl alcohol to thereby form a product consisting substantially essentially of a cellulose ether containing at least one aralkyl radical for every glucose radical present and coupling said ether with a diazotate, said aralkyl alcohol and said diazotate being so selected that at least one of them carries at least one auxochrome group.

15. A process for the manufacture of new dyestuffs comprising reducing a cellulosic material consisting substantially essentially of a cellulose nitro-benzoate, then treating with acid to form an amino salt, thereafter diazotizing said salt and coupling the diazotate with a suitable coupling agent carrying at least one auxochrome group.

16. A process for the manufacture of new dyestuffs which comprises reducing a cellulosic material consisting substantially essentially of a cellulose nitrobenzyl ether, then treating with acid to form an amino salt, thereafter diazotizing said salt and coupling the diazotate with a suitable coupling agent carrying at least one auxochrome group.

RALPH DINKLAGE.